US012291905B2

(12) United States Patent
Klotz

(10) Patent No.: US 12,291,905 B2
(45) Date of Patent: May 6, 2025

(54) SEALED LOCKING FIXTURE

(71) Applicant: Otto Ganter GmbH & Co. KG Normteilefabrik, Furtwangen (DE)

(72) Inventor: Uwe Klotz, Brigachtal-Klengen (DE)

(73) Assignee: OTTO GANTER GMBH & CO. KG NORMTEILEFABRIK, Furtwangen (DE)

( * ) Notice: Subject to any disclaimer, the term of this patent is extended or adjusted under 35 U.S.C. 154(b) by 1339 days.

(21) Appl. No.: 16/231,439

(22) Filed: Dec. 22, 2018

(65) Prior Publication Data

US 2020/0048942 A1 Feb. 13, 2020

(30) Foreign Application Priority Data

Aug. 7, 2018 (DE) ......................... 102018119140.5

(51) Int. Cl.
*E05C 3/04* (2006.01)
*E05B 17/00* (2006.01)

(52) U.S. Cl.
CPC ............ *E05C 3/042* (2013.01); *E05B 17/002* (2013.01); *E05Y 2201/10* (2013.01); *E05Y 2600/502* (2013.01); *E05Y 2600/632* (2013.01); *E05Y 2800/12* (2013.01); *E05Y 2800/428* (2013.01); *E05Y 2900/20* (2013.01)

(58) Field of Classification Search
CPC ...... E05C 3/042; E05B 17/002; E05B 35/008; E05Y 2600/502; E05Y 2600/632; E05Y 2800/12; E05Y 2800/428; E05Y 2900/20; E05Y 2201/10; Y10T 70/7684; Y10T 70/7706; Y10T 70/7712; Y10T 70/7718; Y10T 70/7723; Y10T 70/7655; Y10T 70/531
See application file for complete search history.

(56) References Cited

U.S. PATENT DOCUMENTS 1,891,214 A * 12/1932 Falk ...................... E05B 27/083 70/404
2,170,205 A * 8/1939 Lombardo ............ E05B 27/086 70/491
(Continued)

FOREIGN PATENT DOCUMENTS

CN 102966263 A * 3/2013 ........... E05B 65/006
CN 108086813 A 5/2018
(Continued)

*Primary Examiner* — Christine M Mills
*Assistant Examiner* — Faria F Ahmad
(74) *Attorney, Agent, or Firm* — FISHERBROYLES, LLP; Roger L. Browdy; Ronni S. Jillions

(57) ABSTRACT

A locking fixture that has a housing (1) with a male thread, that can be installed in a hole in a door or a mounting plate (13), in the housing bore (34) of which, an actuator shaft (2) with limited rotation that has a locking tongue (9) on its exposed end is supported such that it can be rotated by means of an actuating section (12) formed on the actuator shaft (2), and has a screw sleeve (7) with a female thread, which secures the locking fixture to the door or mounting plate (13), wherein, in obtaining a hygienic design, the actuator shaft (2) is sealed at both ends where it passes through the housing (12) and the rotation limiter (5, 16, 23, 24) is located in the sealed housing bore (34).

7 Claims, 4 Drawing Sheets

(56) References Cited

U.S. PATENT DOCUMENTS 3,339,384 A * 9/1967 Greenwald ........... E05B 27/083 70/378
3,524,335 A * 8/1970 George ................. E05B 27/083 70/404
3,648,492 A * 3/1972 Walters ................. E05B 27/083 70/404
3,903,720 A * 9/1975 Scherbing ............. E05B 27/083 70/382
4,583,775 A * 4/1986 Bisbing ................... E05C 3/042 292/64
4,671,547 A * 6/1987 Weinerman ............. E05C 3/042 292/197
4,679,835 A * 7/1987 Weinerman ............. E05C 3/042 292/197
5,020,349 A * 6/1991 Lee ....................... E05B 27/083 70/419
5,961,162 A * 10/1999 Glaser ..................... E05C 3/042 292/DIG. 53
6,209,369 B1 * 4/2001 Freck ...................... E05C 3/042 70/427
6,408,662 B1 * 6/2002 Sugimoto ............... E05C 3/042 70/369
6,550,299 B1 * 4/2003 Lin ....................... E05B 27/083 70/378
6,568,226 B1 * 5/2003 Ramsauer ............... E05C 3/042 292/114
6,698,264 B1 * 3/2004 Liao ...................... E05B 27/001 70/419
7,350,382 B2 * 4/2008 Hoffmann ........... E05B 17/0004 292/DIG. 64
7,441,427 B2 * 10/2008 Vickers ................. E05B 35/008 292/64
11,047,156 B2 * 6/2021 Liu ..................... E05B 17/0025
11,131,115 B2 * 9/2021 Carabalona ............. E05C 3/145
2005/0115288 A1 * 6/2005 BurmahIn ............... E05C 3/042 70/127
2006/0236732 A1 * 10/2006 Hoffman ................. E05C 3/042 70/127
2018/0148958 A1 * 5/2018 Liu ........................... E05C 5/00
2019/0063112 A1 * 2/2019 Carabalona ............. E05C 3/042

FOREIGN PATENT DOCUMENTS

DE 8427541 U1 1/1985
DE 202011105345 U1 12/2012
DE 202013104438 U1 10/2013
DE 202014009753 U1 3/2016

* cited by examiner

SEALED LOCKING FIXTURE

CROSS-REFERENCE TO RELATED APPLICATION

The present application claims priority to DE 102018119140.5, filed Aug. 7, 2018, the entire disclosure of which is hereby expressly incorporated herein by reference.

BACKGROUND/SUMMARY

The disclosure relates to a sealed locking fixture.

A number of locking fixtures that are not sealed are known, which can be traced back to the same applicant and are distinguished in that there is an actuator shaft that is rotatably mounted in a dedicated housing and a rotation limiter between the housing and the actuator shaft, with the aim of bringing a locking tongue that is connected to the actuator shaft for conjoint rotation therewith into two different rotational positions.

Such a locking fixture is used in particular in furniture construction, switch boxes, etc. and is also known as a "casing lock."

The characterizing aspect of this type of locking fixture is that there is a rotating actuator shaft connected to the locking tongue for conjoint rotation therewith, wherein the locking tongue is disengaged from part of a piece of furniture, a frame or other stop surface lying opposite, when it is in the one rotational position, and when it is in locked engagement, the locking tongue bears on the back surface of a piece of furniture, or some other stop surface.

Such a locking fixture has proven to be reliable in a number of applications, but has the disadvantage that it does not satisfy increased hygiene requirements.

In accordance with all of the relevant branches of industry, such as the food, pharmaceutical and cosmetic industries, or biotechnology, public health authorities regard both their main duties as well as their concerns therein, to keep dietary products and products for treating humans, as well as animals in the broader sense, as free from damaging effects as possible. In the framework of this political scenario, the safety, quality and storage life of the product given to the consumer is decisive. All intentions to protect the consumer therefore pertain to product safety, in order to protect against toxic substances and relevant micro-organisms and eliminate health risks, both prophylactically as well as sustainably.

It is characteristic of the industrial fields in which highly sensitive hygienic products are produced that the intention of the law originally only comprised hygiene and quality measures for the products, and only the cleanliness prior to starting a process played an important role in processing plants. In recent years, legal guidelines have been added to these requirements: "hygienic design," i.e. easily cleaned and hygienic design of the processing facilities, has become an important requirement for safe production set forth in the context of consumer protection laws.

Recent findings and economic considerations have shown that only by combining the two aims, "product" and "production plant," can the intended high level of quality, with a longer shelf-life, be obtained in the products.

The basic concepts of "hygienic design" are explained in the reference book, "Gerhard Hauser: Hygienische Produktionstechnologie [EN: Hygienic Production Technology], 2008, pp. 1-7, WILEY-VCH publishers GmbH & Co. KGaA, Weinheim, ISBN: 978-3-527-30307-3, based on fundamental examples.

Hygiene is presently understood to refer to, in addition to the fundamental meaning relating to "health" or "promoting health," all fields that have the aim of preventing risks and danger to human health through contamination by relevant microorganisms and other substances when consuming products.

For this reason, production processes must be optimized from a technological perspective (e.g. coordination of mass flows, dwell times, temperatures), and controlled with regard to possible effects on the products. In order to also eliminate contamination by microorganisms and substances that reduce quality, all of the facilities, apparatuses and components, as well as the processing environment, particularly with processing facilities that are exposed to the environment during production or need to be inspected. In a comprehensive quality control, all causes of negative effects to the product must be eliminated.

Although in many fields in the aforementioned industries product processing and cleaning have always been regarded as equally important, the positive effects of hygienic plants and component designs have not been regarded as relevant, or have been simply neglected for some time.

In some fields, the view is held that cleanliness can be ensured in practically any facility through a high concentration of appropriate, largely aggressive cleansers and disinfectants, as well as through sufficient cleaning periods and high temperatures. Furthermore, the argument is currently raised that with products that are pasteurized or sterilized immediately before bottling or packaging, hygienic aspects during the production may not necessarily play a decisive role, because killing relevant microorganisms in the last step is ultimately decisive.

The fact that, when there is already an increased load to the product with microorganisms during production, this can have a decisive effect on the quality thereof, and makes decontamination more difficult and expensive, is being neglected thereby. Moreover, the increased risk of resulting toxic metabolic products with an increased and uncontrolled number of microorganisms needs to be taken into account.

Because of the learning processes in this field, the perspective has changed decisively in the past, such that promotion of a hygienic facility design has taken on substantial prominence. Technical terms such as "hygienic design" have become commonplace among persons skilled in the art whose work involves questions of hygiene in conjunction with production and production plants. The ease of cleaning, and thus the success in cleaning, can be improved by hygienic design, using appropriate structural design measures, which have also become legal requirements in various fields, thus ensuring that the facilities are cleaned.

So-called hygienic casing locks are known in the field of hygiene, such as those disclosed in, e.g., DE 20 2013 104 438 U1 and DE 20 2011 105 345 U1. These locks are distinguished by a seal between parts that move in relation to one another.

In particular in the field of hygiene, where the locking fixture should be sealed against dust and liquids, the locking fixtures according to the prior art have the disadvantage that there is a retaining pin, projecting outward in the region of the actuator shaft, which limited rotation of the shaft.

This resulted in the disadvantage that there were rotation limiters on the radial, outer circumference of the actuator shaft, e.g. in the form of a cylindrical pin, that were not sealed against the exterior. Such an assembly does not protect against liquids and dust that may be present in a hygienic area, or other areas subject to increased sanitary requirements.

An object of the disclosure is therefore to further develop a locking fixture of the type described in the introduction, which can be sealed, and satisfies the requirements of hygienic design.

One feature of the disclosure is that the actuator shaft passes through a housing in a sealed manner, and that there is a rotation limiter in the sealed region of the housing bore.

According to an advantageous embodiment, the actuator shaft is sealed at both ends where it passes through the housing, and the rotation limiter is located in the sealed housing bore, thus obtaining a hygienic design.

The technical teaching results in the advantage that the rotation limiter is no longer located outside the housing, but instead is integrated in a sealed manner in the housing itself, which is of particular advantage.

This offers the possibility of entirely sealing the housing in relation to the actuator shaft, such that there are no longer any parts outside the housing that are subject to the effects of liquids and dust, and in particular, such liquids and dust can no longer enter the interior of the housing.

As a result of the internal rotation limiter, a previously unknown increased sealing is obtained that satisfies the high hygiene requirements.

In a first embodiment of the disclosure, the rotation limiter is formed by a cylindrical pin permanently located in the interior of the housing, which interacts with a dedicated stop in a recess in the actuator shaft.

In a second embodiment, the cylindrical pin is connected to the actuator shaft for conjoint rotation therewith, and interacts with dedicated internal stop surfaces in the housing.

Instead of a cylindrical pin, which is located in a blind hole in either the housing or the actuator shaft when it has been installed, in another embodiment the cylindrical pin can be omitted, and the dedicated stop surfaces of the rotation limiter itself can be formed by surfaces on the actuator shaft and the dedicated stop surfaces in the housing. The cylindrical pin can then be omitted, and formed, so to speak, as a materially integral part of the actuator shaft. In this case, grooves are milled in the actuator shaft, that then form a projection, such that these contours form the rotation limiter interacting with the dedicated stop surfaces in the interior of the housing.

In another embodiment, a ring is pressed onto the outer circumference of the actuator shaft, which has a suitable rotation limiting contour or the like, that interacts with dedicated stop surfaces in the interior of the housing.

It can be derived from the explanations above that the disclosure is not limited to a specific type of rotation limiter, and instead every type of rotation limiter is claimed that can be contained in the interior of a housing in a sealed manner.

In a further development of the disclosure, the locking fixture can also be attached to a dedicated mounting surface in a sealed manner.

This sealing can be obtained in the region of a clamping gap, e.g. in which the clamping gap is formed by a screw sleeve that can be screwed to the outer male thread on the housing in the manner of a threaded screw sleeve.

As a matter of course, the locking fixture can be attached to the mounting surface by any arbitrary means, e.g. the housing of the locking fixture can be riveted, clamped, wedged or glued into a dedicated receiving hole.

In a preferred embodiment, the clamping gap can also be sealed on both sides with flat gaskets, such that the housing is also installed in a dedicated hole on a piece of furniture or mounting surface in a sealed manner.

In a preferred embodiment, the screw sleeve is also sealed off from the housing 1. For this, it is preferred that the screw sleeve is attached in a sealed manner to the outer circumference of the housing with a dedicated rod seal.

In another embodiment of the disclosure, the locking tongue connected to the actuator shaft for conjoint rotation therewith is also attached to the actuator shaft 2 in a sealed manner. For example, a dedicated polygonal hole in the locking tongue that is placed on the polygonal outer circumference of the actuator shaft 2, is surrounded on both sides by gaskets.

In this manner, water is safely prevented from entering the interior of the housing, and the actuator shaft 2 is thus sealed off from the housing at both ends.

In some cases, it may also be sufficient to seal the actuator shaft and the housing at only one end, e.g. where the actuator tool engages with the actuator shaft. The seals described above on the locking tongue and the screw sleeve can then be omitted.

In another embodiment, a seal may be provided at both the actuating end and at the locking end, resulting in a full seal.

The conjoint rotational connection between the locking tongue and the actuator shaft can be formed in an arbitrary manner. In the exemplary embodiments shown herein, this is obtained with a square hole. It can also be a obtained with a slot hole, i.e. two bearing surfaces, or it can be formed by a star-shaped hole with numerous bearing surfaces.

It is also not necessary for the locking tongue to be in the shape of a tongue, i.e. with an angled form. Locking tongues of other shapes can also be used that are suitable on the whole for bracing against a furniture surface or a stop surface.

It is also not necessary with regard to the solution for the locking tongue to be attached to the actuator shaft using a hexagon-headed screw. Other fastening means can also be used, e.g. rivets, adhesives, wedges, or clamps.

The inventive subject matter of the present disclosure can be derived not only from the subject matter of the individual claims, but also by combining the individual claims. All of the information and features disclosed in the documents, including the abstract, and in particular the physical embodiments illustrated in the drawings, can be claimed as part of the disclosure. Use of the terms “substantial” or “according to the disclosure” or “substantial to the disclosure” is subjective, and does not imply that the feature referred to as such must necessarily be a component of one or more claims.

BRIEF DESCRIPTION OF THE DRAWINGS

The disclosure shall be described in greater detail below based on drawings illustrating just one embodiment. Further features and advantages of the disclosure that are substantial to the disclosure can be derived from the drawings and the descriptions thereof.

Therein.

DETAILED DESCRIPTION OF THE DRAWINGS

Figure 1:
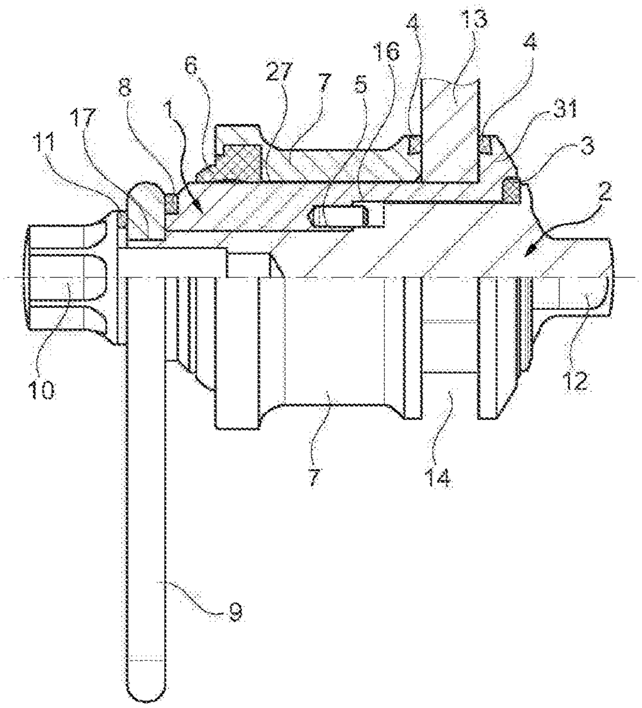
FIG. 1: shows a partial longitudinal section of a locking fixture according to an embodiment of the disclosure.
Figure 2:
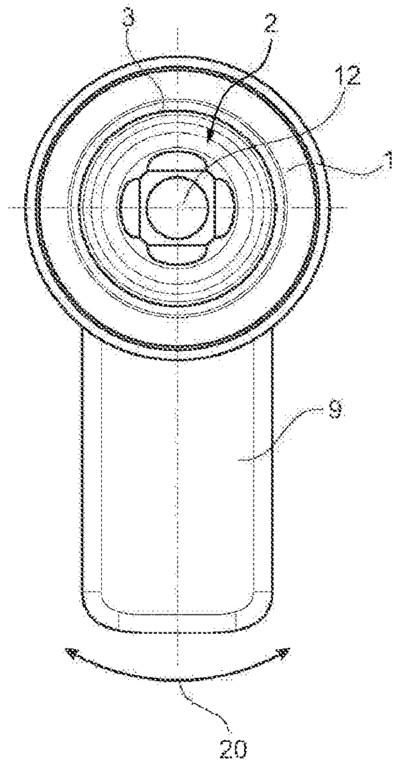
FIG. 2: shows the end view of the locking fixture.

The sealed locking fixture is composed of a cylindrical housing 1, which has a center bore 15, in which an actuator shaft 2 that has sections of two different diameters engages and is supported therein such that it can rotate. The center bore 15 thus forms the housing bore 34.

The actuator shaft 2 has a square end 12, on which an actuating tool can be placed for rotating the actuator shaft 2.

Instead of a square end 12, it can be configured for other actuating tools, e.g. an actuating lever or the like can be used instead of a tool fitting a square end 12.

The actuator shaft 2 is composed of two cylindrical sections 29, 30 of different diameters in the exemplary embodiment shown in the drawings, wherein the cylindrical section 30 with the smaller diameter adjoins the square end 12, and the cylindrical section 29 with the greater diameter is joined to the cylindrical section 30 in a materially integrated manner.

There is a recess 16 in the exemplary embodiment in the transition region between the cylindrical section 29 and the smaller diameter cylindrical section 30, which forms the sealed rotation limiter in conjunction with a cylindrical pin 5.

Figure 3:
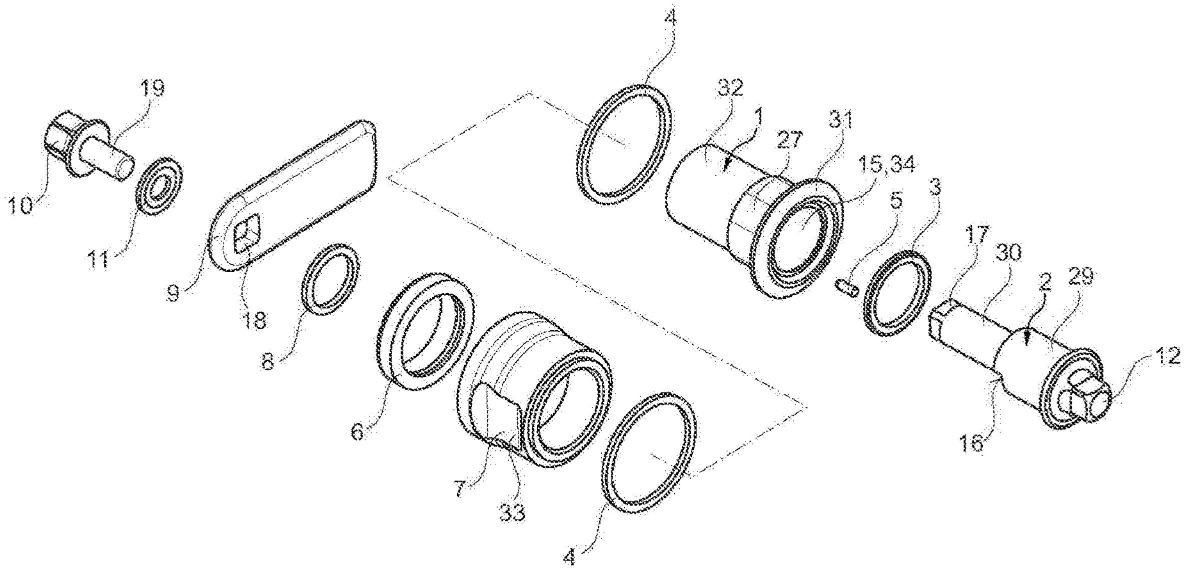
FIG. 3: shows the construction of the locking fixture in an exploded view.
Figure 4:
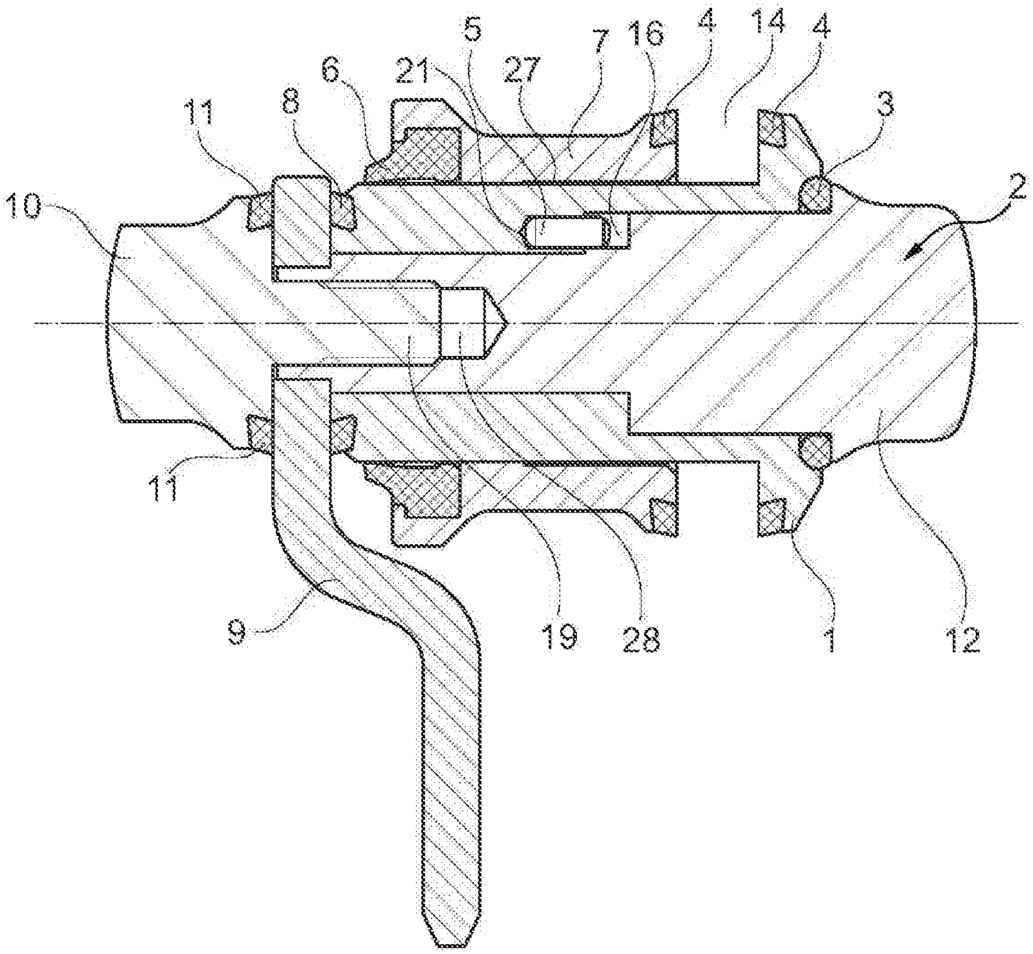
FIG. 4: shows a longitudinal section of the locking fixture in the manner of the illustration in FIG. 1.

According to FIGS. 1 and 3, an O-ring is provided that seals the actuator shaft 2 in relation to the end of the housing 1 at the end of the actuator shaft.

Instead of an O-ring, other sealing means can be used, e.g. a sealing washer or the like.

The important thing is that a cylindrical pin 5 is located in the interior of the housing 1 in the exemplary embodiment, specifically in its center bore 15, and thus, a sealed rotation limiter is obtained in conjunction with the recess 16 on the actuator shaft.

There is a thread 27 on the outer circumference of the housing 1 in the form of a male thread, onto which the female thread of a dedicated screw sleeve 7 is screwed.

The front end surface of the screw sleeve 7 thus forms a clamping gap 14 in conjunction with the end section 31 with an enlarged diameter, that can be tightened down in a dedicated hole in a mounting plate 13.

In a preferred embodiment, this receiving, or clamp hole is sealed in the region of the clamping gap 14 using two opposing gaskets 4, which are located on both sides of the mounting plate 13, shown only in part, in a sealed manner.

There is a rod seal 6 embedded in the screw sleeve 7 at the rear end of the screw sleeve 7, which bears in a sealed manner on the outer circumference of the section 32 of the housing 1, such that the screw sleeve 7 can be screwed onto the thread 27 on the housing 1 in a sealed manner.

As a matter of course, other sealing means can be used instead of a rod seal, e.g. an O-ring, or gasket.

A plate-shaped locking tongue 9 is provided for mounting the fixture on a furniture surface or other stop surface, which has a square hole 18, which is fastened to the square end 17 of the actuator shaft 2 with a hexagon-headed screw 10, such that rotates conjointly therewith.

The hexagon-headed screw 10 has a threaded section 19, which passes through the square hole 18 and is threaded into a threaded hole 28 in the actuator shaft 2, and secured therein.

It is also preferred here that the locking tongue 9 is sealed on both sides on the actuator shaft 2, specifically by the rear gasket 11 on the actuator shaft and by the front gasket 8 with respect to the housing 1.

It is ensured in this manner that no liquids or dust can get into the interior of the housing at the end where the locking tongue 9 is located.

FIG. 3 also shows that the screw sleeve 7 can have one or more tool surfaces 33 for an appropriate tool.

It is preferred that there is a rotation limiter between the actuator shaft 2 and the housing 1 that is integrated and sealed in the interior of the housing 1.

Figure 6:
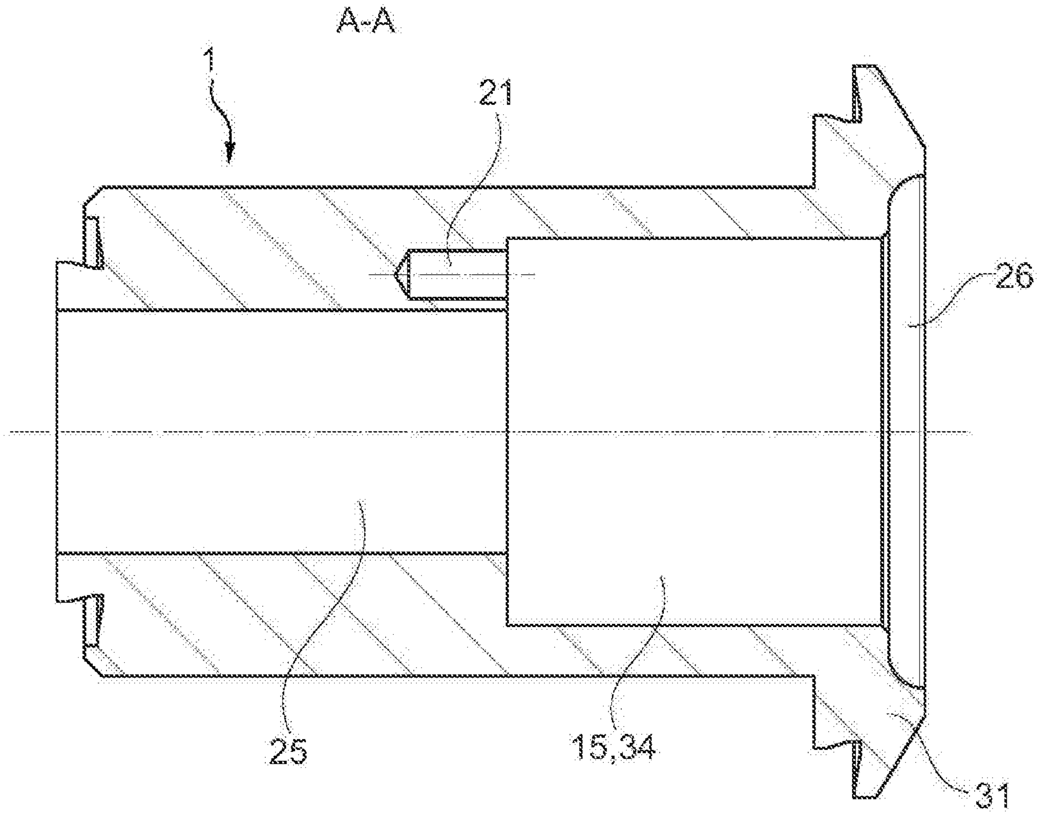
FIG. 6: shows a section through the housing.

For this, a blind hole 21 is formed in the region of an end surface housing section of the housing 1, as shown in FIG. 6, into which a cylindrical pin 5 is pushed. This extends in FIG. 1 into the transition region between the two cylindrical sections 29, 30 at its front exposed end, and can thus be brought into contact with the respective recess 16 in the actuator shaft 2. This results in a sealed rotation limiter for the actuator shaft 2 in the housing 1.

Figure 5:
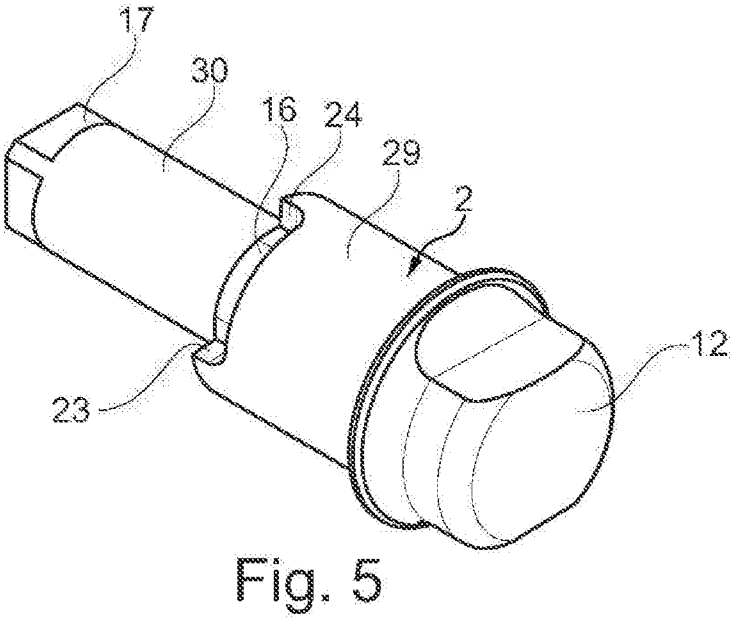
FIG. 5: shows a perspective view of the actuator shaft.

Further details of the rotation limiter can be derived from FIG. 5, showing that there is a recess 16 with a reduced diameter in the end region of the cylindrical section 29, that extends over an angle of 90°, for example.

The cylindrical pin 5 engages in this recess 16 at its front exposed end, and can thus be brought to either the left-hand stop surface 23 or the right-hand stop surface 24, depending on the rotation of the actuator shaft.

The recess 16 allows the actuator shaft 2 to rotate 90° in the exemplary embodiment.

As a matter of course, the recess 16 can be such that other angles of rotation are allowed for, e.g. 30°, 60°, 90°, or 120°, etc.

It may also be the case that there is not just one cylindrical pin 5, but numerous cylindrical pins, evenly distributed over the circumference of the housing, which interact with dedicated recesses 16 on the actuator shaft 2.

It has already been noted in the general description portion of this application that a kinematic reversal is also claimed in the scope of the present disclosure, specifically such that a cylindrical pin is located on the actuator shaft 2 in the region of section 29, that projects axially, and interacts with dedicated internal stop surfaces in the interior of the housing 1 in the center bore 15.

The aforementioned means of obtaining a rotation limiter are also to be comprised herein in the illustrated exemplary embodiment.

FIG. 6 shows a seal seat 26 on the end surface of the housing 1 in the section 31 with the larger diameter, which accommodates the O-ring 3.

FIG. 6 also shows that there is a stepped bore in the interior of the housing, specifically, the center bore 15 with the larger diameter transitions into a bore 25 with a smaller diameter, such that the section 29 of the actuator shaft 2 with the larger diameter engages in the bore 15, and the cylindrical section 30 with the smaller diameter engages in the bore 25 in the housing 1 with the smaller diameter.

Accordingly, it is an aspect of the disclosure that there is a sealed rotation limiter in the housing 1 facing the actuator shaft 2, and the entire locking fixture is protected as a whole with internal and external seals against moisture and dirt.

It is ensured in this manner, that the rotation limiter in particular can no longer be affected by external dirt and dust.

As a result of the cylindrical pin 5, the assembly is also particularly simple.

To disassemble the locking fixture, the hexagon-headed screw 10 is simply loosened. The locking tongue 9 can then be removed from the actuator shaft 2, and the actuator shaft 2 can then be pulled out of the center bore 15 in the housing 1 in the axial direction.

REFERENCE SYMBOLS

1 housing
2 actuator shaft
3 O-ring
4 gasket
5 cylindrical pin
6 rod seal
7 screw sleeve
8 gasket
9 locking tongue
10 hexagon-headed screw
11 gasket
12 square end (on 2)
13 mounting plate
14 clamping gap
15 center bore (in 1)
16 recess (on 2)
17 square end (on 2)
18 square hole (in 9)
19 threaded section
20 direction of arrow
21 blind hole
22
23 stop surface
24 stop surface
25 bore
26 seal seat
27 thread
28 threaded hole (in 2)
29 cylindrical section (of 2)
30 cylindrical section (of 2)
31 section (of 1)
32 section (of 1)
33 tool surface
34 housing bore

The invention claimed is:

1. A locking fixture, comprising:

a housing including a bore and a male thread, the housing installable within an opening;

an actuator shaft having first and second opposite ends, the actuator shaft rotatably received within the bore of the housing through a limited rotation extent, the second end of the actuator shaft exposed outwardly of the housing;

a seal received between the first end of the actuator shaft and the housing;

a locking tongue supported on the second end of the actuator shaft and including an actuating section extending from the actuator shaft;

first and second gaskets received on opposite sides of the locking tongue, the first gasket sealing the locking tongue with respect to the housing and the second gasket sealing the locking tongue with respect to the second end of the actuator shaft;

a screw sleeve including a female thread received on the male thread of the housing, the screw sleeve cooperating with the housing to secure the locking fixture with respect to the opening;

a blind hole extending longitudinally defined in a region of an end surface housing section of the housing into which a cylindrical pin is pushed;

a rotation limiter located in the bore and sealed between the seal and first gasket, the rotation limiter operable to limit the rotation extent of the actuator shaft; and the actuator shaft sealed at each of its opposite ends with respect to the housing bore by the seal and the first and second gaskets;

wherein the rotation limiter comprises the cylindrical pin located within an interior of the housing, and engageable with at least two stop surfaces on the actuator shaft;

wherein the at least two stop surfaces are disposed at respective ends of a recess in the actuator shaft; and wherein the actuator shaft comprises a first cylindrical section having a first cylindrical section diameter and a second cylindrical section having a second cylindrical section diameter, the first cylindrical section having a greater diameter different from the smaller second cylindrical section diameter, wherein the recess with a reduced diameter is located in an end region of the first cylindrical section, wherein the cylindrical pin extends into a transition region between the first and second cylindrical sections at a front exposed end, whereby the cylindrical pin is brought into contact with the recess in the actuator shaft.

2. The locking fixture of claim 1, wherein the cylindrical pin is connected to the actuator shaft for conjoint rotation therewith, the cylindrical pin projecting axially from the actuator shaft.

3. The locking fixture of claim 1, further comprising a rod seal disposed between the screw sleeve and the housing.

4. The locking fixture of claim 1, wherein the locking tongue includes a polygonal hole mounted on a receiving polygonal outer circumference of the actuator shaft.

5. The locking fixture of claim 1, wherein the actuator shaft includes a plurality of grooves forming a projecting contour engageable with at least two stop surfaces disposed within an interior of the housing.

6. The locking fixture of claim 1, wherein the at least two stop surfaces comprise a left stop surface and a right stop surface at respective ends of the recess, wherein the cylindrical pin engages in the recess in the actuator shaft at the front exposed end, and wherein the cylindrical pin is brought to contact either the left stop surface or the right stop surface, depending on a direction of rotation of the actuator shaft.

7. The locking fixture of claim 1, wherein the recess with a reduced diameter in the end region of the first cylindrical section extends over an angle of 90°, whereby the recess allows the actuator shaft to rotate 90°.

* * * * *